Patented June 27, 1944

2,352,200

UNITED STATES PATENT OFFICE 2,352,200

PRODUCTION OF TOLUENE

Vladimir N. Ipatieff and George S. Monroe, Chicago, Ill., assignors to Universal Oil Products Company, Chicago, Ill., a corporation of Delaware No Drawing. Application May 24, 1941, Serial No. 395,056

10 Claims. (Cl. 260—671)

This invention relates to the production of toluene by interaction of benzene and methane in the presence of a catalyst. More specifically it is concerned with the conversion of benzene into substantial yields of toluene and diphenyl in the presence of a silica-containing catalyst.

It is recognized that benzene has been converted into toluene and more-highly methylated benzenes by treatment with methyl chloride in the presence of aluminum chloride catalyst. Methyl chloride so employed as a methylating agent must be prepared synthetically and is more expensive than methane, the relatively abundant gaseous paraffin hydrocarbon utilized in the process of the present invention which employs a silica-containing catalyst to assist in removing hydrogen and effecting combination between benzene and methane.

In one specific embodiment the present invention comprises a process for producing toluene which comprises contacting benzene with methane at a temperature of from about 350° to about 750° C. in the presence of a synthetically prepared composite of silica and one or more of alumina, zirconia, and thoria.

Silica-containing catalysts suitable for use in the process of the present invention may be prepared by a number of alternative methods which have certain features in common as will subsequently be described.

Generally speaking, however, the silica-containing methylating catalysts as referred to in this specification and in the claims, may be considered to comprise intimate combinations of silica with alumina, zirconia, and/or thoria all of which components possess more or less low activity individually but display high activity in the aggregation. This activity is not an additive function, as it is relatively constant for a wide range of proportions of the components whether in molecular proportions or fractions of molecular proportions. No one component may be determined as the one component for which the remaining components may be considered as the promoters according to conventional terminology, nor can any component be definitely stated to be the support and the others the catalyst proper.

According to one general method of preparation the preferred silica-containing catalysts may be prepared by precipitating silica from solution as a hydrogel and subsequently admixing or depositing the hydrogels of alumina, zirconia, and/or thoria upon the hydrated silica. One of the more convenient methods of preparing the silica hydrogel is to acidify an aqueous solution of sodium silicate by the addition of an acid, such as hydrochloric acid, for example. The excess acid and the concentration of the solution in which the precipitation is brought about determine in some measure the suitability of the silica hydrogel for subsequent deposition of the hydrogels of alumina, zirconia, and/or thoria. In general, suitable hydroated silica may be produced by the use of dilute solutions of sodium silicate and the addition of a moderate excess of acid whereby the desired active silica gel is obtained and conditions of filtering and washing are at an optimum.

After precipitating the silica hydrogel, it is treated and washed to substantially remove alkali metal ions. It is not known whether the alkali metal ions, such as sodium ions, are present in the primary gel in chemical combination, or in an adsorbed state but it has been determined definitely that their removal is necessary if catalysts are to be obtained suitable for prolonged use in accelerating hydrocarbon conversion reactions of the present character. It is possible that the presence of the alkali metal impurities causes a sintering or fluxing of the surfaces of the catalyst at elevated temperatures so that the porosity is much reduced with corresponding reduction in effective surface. Alkali metal ions may be removed by treating the hydrated gel with solutions of acidic materials, ammonium salts, or salts of aluminum, zirconium, and/or thorium. When treating with acids, as for example with hydrochloric acid, the acid extracts alkali metal impurities from the silica gel. The salts formed and acid are then substantially completely removed by water washing treatment. Where ammonium salts, or salts of aluminum, zirconium, and/or thorium are used, the ammonium or multivalent metals used apparently displace the alkali metal impurities present in the composite and the alkali metal salts formed, together with the major portion of the multivalent salts, are removed in the water washing treatment. Some of the multivalent metals introduced into the silica hydrogel in the purifying treatment may become a permanent part of the composite, whereas in the treatment with ammonium salts small amounts of the ammonium salts remaining after the washing process will be driven off in subsequent treatment at elevated temperatures.

Ine one of the preferred methods of compositing the hydrogel materials, the purified precipitated hydrated silica gel may be suspended in a solution of aluminum, zirconium, and/or thorium salts in the desired proportion and the alumina, zirconia, and/or thoria hydrogel deposited upon the suspended silica hydrogel by the addition of volatile basic precipitants, such as ammonium hydroxide, ammonium carbonate, ammonium hydrosulfide, ammonium sulfide, or other materials, such as organic bases, may be employed. According to this method, the purified silica gel may be suspended in a solution of aluminum chloride, zirconyl nitrate, and/or thorium nitrate, for example, and the hydrated alumina, zirconia, and/or thoria precipitated by the addition of ammonium hydroxide. In this example, the alumina, zirconia and/or thoria are co-precipitated.

Alternatively the purified silica gel may be mixed while in the wet condition with separately prepared hydrated alumina, hydrated zirconia, and/or hydrated thoria, precipitated either separately or concurrently, as for example by the addition of volatile basic precipitants to solutions of aluminum, zirconium, and/or thorium salts. The hydrated alumina, hydrated zirconia, and/or hydrated thoria thus prepared are substantially free from alkali metal ions and can be mixed with purified silica gel. However, if alkali metal ions are incorporated as when the hydrated alumina is prepared from sodium aluminate, for example, or if zirconium and/or thorium tetrahydroxides are precipitated by the interaction of zirconyl nitrate and/or thorium nitrate and sodium hydroxide, regulated purification treatment and water washing, by methods selected from those described in connection with the purification of hydrated silica gel to remove alkali metal ions, will be required. Care should be observed in the selection and concentration of reagents used so as not to dissolve unduly large amounts of alumina, zirconia, and/or thoria.

As further alternative proceeding in the preparation of the preferred methylating catalysts purified silica gel may be added to a solution of salts of aluminum, zirconium, and/or thorium and hydrated alumina, hydrated zirconia, and/or hydrated thoria may be deposited by hydrolysis with or without the use of heat, or the purified silica gel may be mixed with suitable amounts of salts of aluminum, zirconium, and/or thorium, as, for example, to form a paste and heated whereby alumina, zirconia, and/or thoria are deposited upon the silica gel as a result of the decomposition of the aluminum, zirconia, and/or thorium salts.

By the methods above described, a silica hydrogel free from alkali metal ions was admixed or had deposited thereon relatively pure hydrated alumina, hydrated zirconia, and/or hydrated thoria prior to the drying treatment. In methods described below, the hydrated silica with a hydrated alumina, hydrated zirconia, and/or hydrated thoria are concurrently precipitated or admixed and treated to remove the alkali metal ions from the composited material prior to drying treatment, either in the presence of the original reactants or subsequent to water washing. Thus, solutions of silicon compounds, more usually alkali metal silicates and soluble aluminum, zirconium, and/or thorium salts may be mixed under regulated conditions of acidity or basicity to jointly precipitate hydrated silica, hydrated alumina, hydrated zirconia, and/or hydrated thoria in varying proportions. For example, solutions of sodium silicate, aluminum chloride, zirconyl nitrate, and/or thorium nitrate may be mixed and an alkaline or acid reagent added according to the proportions used so that in the mix a pH in the range of about 3 to about 10 is obtained. In cases where a sol is formed, the precipitation may be brought about if the sol is acid by the addition of a volatile base, as for example, ammonium hydroxide, and alkali metal salts may be removed by water washing, or the composite may be treated as indicated above in connection with the purification of the hydrated silica to remove alkali metal ions. Various methods are possible for the preparation of the hydrated silica, hydrated alumina, hydrated zirconia, and/or hydrated thoria separately or in combination and the purifying treatment is always necessary where alkali metal ions are present in substantial amounts.

The character and efficiency of the ultimately prepared silica-containing catalysts vary more or less with methods of precipitation and/or mixing, purification treatment, ratio of components, calcining, etc. The ratio of the components may be varied within relatively wide limits, the limiting factor being more in evidence with respect to small proportions than with large proportions of the various components. In general, it appears that from 2 to about 6 mole per cent of alumina, zirconia, and/or thoria together with reference to silica may be considered an approximation of the minimum proportions.

After the alumina, zirconia, and/or thoria have been mixed with or deposited on the purified silica gel and water washed, if desired, as described for one general method of preparation, or after the hydrated silica, hydrated alumina, hydrated zirconia, and/or hydrated thoria have been composited and treated to remove the alkali metal ions, as described for another general method of preparation, the catalytic materials may be recovered as a filter cake and dried at a temperature in the order of 115° to 150° C., more or less, after which they may be formed into particles of a suitable average definite size ranging from powder to particles of various forms and sizes obtained by pressing and screening, or otherwise formed into desirable shapes by compression or extrusion methods.

By calcining at temperatures of the order of approximately 450° to 550° C., or higher, the maximum activity of the silica-base catalyst is obtained and a further dehydration occurs so that, for example, after a considerable period of heating at 500° C., the water content, as determined by analysis, is of the order of 2 to 3%.

Silica-containing methylating catalysts prepared by the various types of procedures outlined above evidently possess large total contact surfaces corresponding to a desirable porosity, the pores of the catalyst particles being of such size and shape that they do not readily become clogged with carbonaceous deposits after a long period of service and are, therefore, not particularly difficult to reactivate by oxidation. This structure is retained, also, after many alternate periods of use and reactivation, as evidenced by the fact that the catalysts may be reactivated rapidly by passing air or other oxidizing gas over the used particles to burn off the deposits of carbonaceous materials at temperatures above 425° C., temperatures as high as 750 to 900° C. having been reached, without apparently affecting the catalytic activity.

In carrying out the reaction between benzene and methane according to the process of the present invention the exact method of procedure and operating conditions employed vary with the proportions of the reacting constituents as well as with the composition and activity of the catalyst employed. The different catalysts which may be employed are thus not necessarily equivalent in their action.

The procedure preferably utilized for effecting methylation of benzene according to the process of this invention consists in passing a mixture of benzene and a molar excess of methane over a fixed bed of one of the herein described silica-containing catalysts maintained at a temperature of from about 350° to about 750° C. under a pressure of from about 50 to about 450 atmospheres. The reaction mixture undergoing treatment preferably contains between about 2 and about 20 molecular proportions of methane per 1 molecular proportion of benzene in order to favor production of toluene and to diminish the reactions which result in formation of diphenyl and of alkylated diphenyl, both of which are valuable products although not the preferred products of the present process.

While the method of passing methane and benzene either together or countercurrently through a suitable reactor containing a fixed bed of silica-containing methylating catalyst is generally customary procedure, interaction of methane and benzene may also be effected in batch type of operation in which the catalyst is present in finely divided form and is preferably maintained in dispersion or suspension by some means of agitation.

In general the products formed during treatment of mixtures of benzene and methane with a silica-containing catalyst are separated from unreacted benzene and methane by suitable means as by distillation and the unreacted portions of the benzene and methane are recycled and commingled with additional quantities of these hydrocarbons being charged to contact with the catalyst. Hydrogen or hydrogen-containing gases produced in the process may also be recycled with the recovered benzene and methane. The reaction product boiling higher than benzene is separated into desired fractions or individual compounds including toluene and diphenyl by distillation at ordinary or reduced pressure or by other suitable means. From the reaction products it is also generally possible to separate certain amounts of more-highly methylated benzenes and some alkylated di-phenyl derivatives.

The following examples are given to illustrate the character of results obtained by the use of the present process, although the data presented are not introduced with the intention of unduly limiting the generally broad scope of the invention.

EXAMPLE I 75.5 parts by weight of 3 x 3 mm. pellets, formed by pelleting and calcining a composite of 100 molecular proportions of precipitated silica and 10 molecular proportions of alumina, was used as a filler in a steel reactor through which a mixture of 8 molecular proportions of methane and 1 molecular proportion of benzene was passed in three runs at temperatures of 501°, 540° and 564° C., respectively, under 234 atmospheres pressure at rates necessary for an average time of contact between about 190 and 200 seconds. In these runs the benzene was charged at an hourly rate corresponding to approximately 0.37 volume of liquid per volume of catalyst. The liquid reaction products were obtained in admixture with unreacted benzene equivalent to between 79 and 87% by weight of that charged. Upon the basis of the weight of benzene consumed in these conversion reactions the yields of toluene, higher alkylated benzenes, and a higher boiling residue consisting largely of diphenyl are shown in Table I.

Table I

| | Run No. | | |
|---|---|---|---|
| | 1 | 2 | 3 |
| Average catalyst temperature, °C | 501 | 540 | 564 |
| Yield, wt. per cent of benzene consumed: | | | |
| Toluene | 21.5 | 27.5 | 19.8 |
| Higher alkylated benzenes | 4.3 | 2.6 | 2.0 |
| Diphenyl residue | 14.3 | 15.1 | 14.0 |

A similar run at 509° C. under under 290 atmospheres pressure in which the methane: benzene ratio was 10, effected 10.4% conversion of the benzene into heavier products. Upon the basis of the benzene consumed, the respective yields of toluene, higher alkylated products (probably containing xylenes) and diphenyl residue were 19.1%, 14.5%, and 14.5%. The increase in pressure in this run over that used in run #1 shown above decreased the toluene yield but increased the formation of higher boiling alkylated aromatics, while the formation of diphenyl residue remained about constant.

Toluene was thus produced by the simultaneous contact of benzene and methane with a silica-containing catalyst at the relatively high temperatures and pressures herein-indicated. A run made in the absence of methane charging benzene at a rate sufficient to give an average contact time of approximately 217 seconds yielded smaller amounts of toluene and larger amounts of diphenyl than obtained in the present runs. Approximately 12% by weight of the benzene so passed over the silica-alumina catalyst underwent conversion. Upon the basis of the weight of benzene consumed the respective yields of toluene, higher methylated benzenes, and diphenyl residue were 5.5%, 3.2%, and 77.6%. Another run in which methane alone was subjected to a similar temperature of about 579° C. for a contact time of 208 seconds yielded no liquid product.

EXAMPLE II

Simultaneous passage of 9 molecular proportions of methane and 1 molecular proportion of benzene through a steel reactor containing 79.8 parts by weight of pellets, formed from 8 molecular proportions of alumina and 100 molecular proportions of silica, maintained at 570° C. under 234 atmospheres pressure effected 20% conversion of the benzene treated. Upon the basis of the benzene converted the respective yields of toluene, higher alkylated products, and diphenyl residue were 18.7%, 1.3%, and 12.9%.

EXAMPLE III

Several runs were made in which benzene was contacted with methane at an average temperature of 555° to 565° C. under 234 atmospheres pressure in a reactor containing 75 parts by weight of the catalyst described in Example I. In most of these runs the molar ratio of methane to benzene charged was approximately 8, but in one run this ratio was reduced to 3.6. The charging rates used and the results obtained in the different runs are shown in Table II:

*Table 2—Catalytic treatment of benzene-methane mixtures*

|  | Run No. | | | | |
|---|---|---|---|---|---|
|  | 1 | 2 | 3 | 4 | 5[1] |
| Length of run, hrs | 2.0 | 2.0 | 4.0 | 2.0 | 3.5 |
| Charge, moles of methane/mole of benzene | 7.79 | 9.1 | 8.3 | 3.6 | 3.7 |
| Charging rate, space velocity: | | | | | |
| Benzene (as liquid) | 1.66 | 0.66 | 0.38 | 0.88 | 0.45 |
| Methane (gas) | 3,120 | 1,465 | 770 | 780 | 715 |
| Average time of contact, seconds | 58 | 103 | 197 | 201 | 241 |
| Liquid hydrocarbons recovered, per cent by wt. of benzene charged: | | | | | |
| Benzene | 88.2 | 83.5 | 78.6 | 85.8 | 81.2 |
| Toluene | 2.2 | 4.1 | 4.2 | 3.2 | 3.4 |
| Higher benzene hydrocarbons | 1.2 | 0.9 | 0.4 | 1.7 | 2.2 |
| Diphenyl residue | 3.1 | 2.9 | 3.0 | 4.5 | 4.2 |
| Liquid products recovered, per cent by wt. of benzene consumed: | | | | | |
| Toluene | 18.5 | 24.9 | 19.6 | 22.7 | 17.9 |
| Higher benzene hydrocarbons | 10.4 | 5.5 | 2.0 | 12.0 | 11.6 |
| Diphenyl residue | 26.4 | 17.7 | 14.0 | 31.4 | 22.3 |

[1] Methane charged contained 10 per cent by volume of hydrogen.

In the above indicated runs the optimum yield of toluene was obtained under the conditions of run #2 in which the average time of contact with the catalyst was approximately 103 seconds. However, the fraction of xylene boiling range and the diphenyl residue both formed in greater proportions at a contact time of 58 seconds than at the much longer contact time of 197 seconds.

Run #4 was made with the charging ratio of methane to benzene at about 3.6. Apparently the total production of aromatic hydrocarbons exclusive of diphenyl was about the same as when the methane-benzene ratio was about 8, but there was also a tendency for an increase in production of a xylene fraction at the expense of toluene yield. About 30% of the benzene consumed was converted into diphenyl and related high molecular weight aromatic hydrocarbons.

Substantial formation of toluene and of a higher boiling benzene hydrocarbon fraction occurred also in run #5 in which benzene was contacted with a methane-hydrogen mixture containing about 10% by volume of the latter.

The character of the process of the present invention and particularly its commercial value are evident from the preceding specification and examples given, although neither section is intended to unduly limit its generally broad scope.

We claim as our invention:

1. A process for producing a substantial yield of toluene which comprises subjecting a mixture of benzene and methane to contact under alkylating conditions in the presence of a synthetically prepared catalyst formed by calcining a composite comprising hydrated silicon oxide and another hydrated oxide, to effect interaction of said benzene and said methane.

2. A process for producing a substantial yield of toluene which comprises subjecting a mixture of benzene and methane to contact under alkylating conditions in the presence of a synthetically prepared catalyst formed by calcining a composite comprising hydrated silicon oxide and a hydrated oxide of aluminum.

3. A process for producing a substantial yield of toluene which comprises subjecting benzene and methane to contact at a temperature of from about 350° to about 750° C. in the presence of a synthetically prepared catalyst formed by calcining a composite comprising hydrated silicon oxide and a hydrated oxide of aluminum.

4. A process for producing a substantial yield of toluene which comprises subjecting benzene and methane to contact at a temperature of from about 350° to about 750° C. in the presence of a synthetically prepared catalyst formed by calcining a composite comprising hydrated silicon oxide and a hydrated oxide of zirconium.

5. A process for producing a substantial yield of toluene which comprises subjecting benzene and methane to contact at a temperature of from about 350° to about 750° C. in the presence of a synthetically prepared catalyst formed by calcining a composite comprising hydrated silicon oxide and a hydrated oxide of thorium.

6. A process for producing a substantial yield of toluene which comprises subjecting benzene and methane to contact at a temperature of from about 350° to about 750° C. under a pressure between about 50 and about 450 atmospheres in the presence of a synthetically prepared catalyst formed by calcining a composite comprising essentially hydrated oxides of silicon, aluminum, and zirconium.

7. A process for producing a substantial yield of toluene which comprises subjecting benzene and methane to contact at a temperature of from about 350° to about 750° C. under a pressure between about 50 and about 450 atmospheres in the presence of a synthetically prepared catalyst formed by calcining a composite comprising essentially hydrated oxides of silicon, aluminum, and thorium.

8. A process for producing a substantial yield of toluene which comprises subjecting benzene and methane to contact at a temperature of from about 350° to about 750° C. under a pressure between about 50 and about 450 atmospheres in the presence of a synthetically prepared catalyst formed by calcining a composite comprising essentially hydrated oxides of silicon and aluminum.

9. A process for producing a substantial yield of toluene which comprises subjecting 1 molecular proportion of benzene and between about 2 and about 20 molecular proportions of methane to contact at a temperature of from about 350° to about 750° C. under a pressure between about 50 and about 450 atmospheres in the presence of a synthetically prepared catalyst formed by calcining a composite comprising essentially hydrated oxides of silicon, aluminum, and zirconium.

10. A process for producing a substantial yield of toluene which comprises subjecting 1 molecular proportion of benzene and between about 2 and about 20 molecular proportions of methane to contact at a temperature of from about 350° to about 750° C. under a pressure between about 50 and about 450 atmospheres in the presence of a synthetically prepared catalyst formed by calcining a composite comprising essentially hydrated oxides of silicon and aluminum.

VLADIMIR N. IPATIEFF.
GEORGE S. MONROE.